Figure 1:
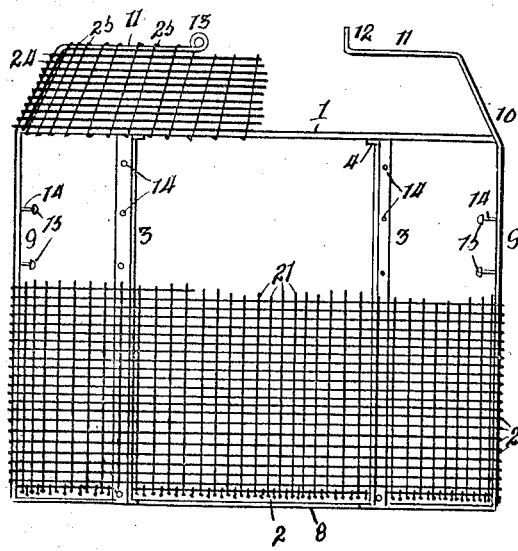

No. 891,944. PATENTED JUNE 30, 1908.
C. F. MASSEY.
BATTERY WELL.
APPLICATION FILED AUG. 20, 1907.

Witnesses:
Wm. P. Bond
Pierson W. Banning

Inventor:
Charles F. Massey
by Banning & Banning
Attys.

UNITED STATES PATENT OFFICE.

CHARLES F. MASSEY, OF CHICAGO, ILLINOIS.

BATTERY-WELL.

No. 891,944.

Specification of Letters Patent.

Patented June 30, 1908.

Application filed August 20, 1907. Serial No. 389,377.

*To all whom it may concern:*

Be it known that I, CHARLES F. MASSEY, a citizen of the United States, residing at Chicago, in the county of Cook and State of Illinois, have invented certain new and useful Improvements in Battery-Wells, of which the following is a specification.

The systems of electric block signaling, used on railways, require the locating, at intervals along the track, local batteries which are brought into operation by a relay in a track circuit, either through a track instrument or by other suitable means; and, generally, these local batteries are arranged adjacent to or in proximity to the signal. These local batteries require to be fully protected against freezing and against injury from other causes, and should, therefore, be surrounded by a closure of a nature that will prevent freezing of the batteries and which is accessible only to the employee who has personal charge of maintaining the batteries in operative condition, and for this reason the batteries should be located in a well or receiver so constructed as to maintain a temperature therein which will prevent freezing of the cells, and this well or receiver should be of a formation to furnish the support for a number of battery cells, and should also be accessible only to the employee or person in charge of the batteries, or some other authorized agent of the railway.

The objects of the present invention are to construct a well or receiver for a plurality of battery cells and formed of a skeleton frame of metal, or other suitable material, inclosed within a wall of concrete and having openings with suitable covers which will render the interior of the well or receiver non-freezing; to construct a framework for a battery well or receiver of metal uprights and an encircling wire or strand mesh adapted for receiving, retaining and supporting an inclosing wall of concrete; to construct a skeleton frame of metal or other suitable material and having vertical studs, strips or uprights provided with headed interlocking pins to receive bracket supports for the reception of shelves within the interior of the battery well or receiver; to construct a battery well or receiver having a skeleton frame of metal or other suitable material and an inclosing wall of concrete furnishing a chamber, adapted to receive shelving on which the battery cells can be placed, and a chamber on the top adapted for the reception of the tools and other appliances and material for making repairs or for recharging the battery cells; and to improve generally the construction of the frame, the wall and the other elements or parts entering into the formation of the battery well or receiver as a whole.

The invention consists in the features of construction and combination of parts hereinafter described and claimed.

Figure 3:
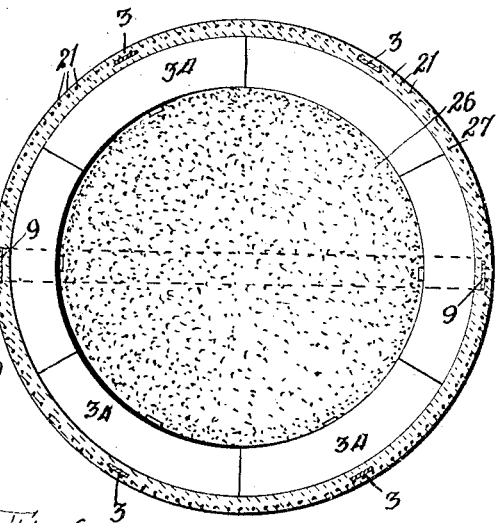
Figure 6:
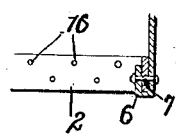
Figure 2:
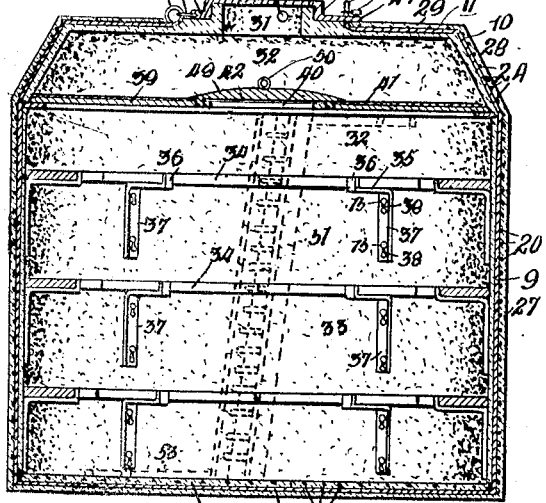
Figures 5, 7, 8, 9, 10:
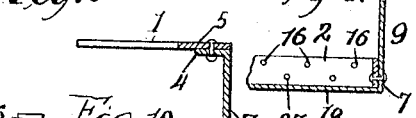
Figure 4:
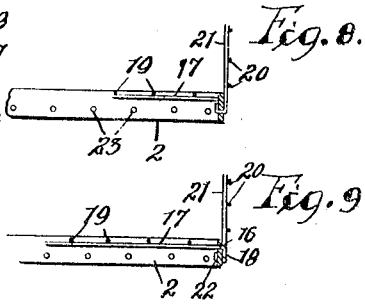

In the drawings Figure 1 is an elevation of the frame, showing the surrounding network or mesh, and extending only partly over the body of the well or receiver and only partly over the top of the well or receiver, but it is to be understood that the network or mesh is to extend entirely over the body and over the top in the completed frame; Fig. 2 a vertical central sectional elevation of the completed well or receiver; Fig. 3 a cross section of the completed well or receiver of Fig. 2; Fig. 4 a detail enlarged, showing a lower corner of the bottom and side wall of the well or receiver; Fig. 5 a detail, partly in section, showing the attachment of some of the vertical studs, strips or uprights to the upper ring of the frame; Fig. 6 a detail, partly in section, showing the attachment of some of the vertical studs, strips or uprights to the lower ring of the frame; Fig. 7 a detail, partly in section, showing the attachment of the continued bottom strip and side or vertical strips or uprights to the bottom ring of the frame; Fig. 8 a detail, partly in section, showing the attachment of the vertical mesh wires or strands to the bottom ring of the frame; Fig. 9 a detail in section, showing the attachment of the bottom mesh wires or strands to the bottom ring of the frame; and Fig. 10 a detail, showing the vertical member of a bracket for supporting the shelves.

The frame, around which is formed the wall of concrete, consists of an upper ring 1, set or standing flat or edgewise horizontally, and a lower ring 2 set or standing vertically edgewise, to which rings the vertical studs, strips or uprights for the frame are connected. The vertical studs, strips or uprights 3, as shown, are four in number, and each stud, strip or upright, at its upper end, has an ear 4, through which and the upper ring 1 a bolt or rivet 5 passes, connecting the upper ring with the vertical studs, strips or uprights; and each vertical stud, strip or upright, at its lower end, is turned on itself to form an ear 6, with a space between the ear and the body of the stud, strip or upright, which space receives the lower band 2 and the lower band 2 has the lower end of each stud, strip or upright attached thereto by a bolt or rivet 7, passing through the band, the upright and the ear, as shown in Fig. 6.

A strip or cross piece 8 of metal or other suitable material, extends across underneath the lower band 2, and is continued upwardly to furnish two side uprights 9, which are secured to the lower band by bolts or rivets 7 or otherwise. Each strip or upright 9 is continued upwardly on an inward inclination so as to furnish a support 10, and the support 10 is continued horizontally from its upper end, so as to form a top strip or support 11 on opposite sides of the frame. The strip or cross support 11, on one side, has its ends upwardly turned to form an ear 12, and the opposite strip or cross support 11 has its end formed into an eye or loop 13, as shown in Figs. 1 and 2. The several vertical studs, strips or uprights 3 and 9, each have a plurality of pins 14 inwardly projecting therefrom, each pin, as shown, having a head 15, and these pins furnish the attachment for the bracket supports for the shelves.

The lower band 2, in the arrangement shown, has a series of holes 16 for the passage of cross wires or strands 17 within the interior of the band; and, as shown, each wire or strand 17, has each end 18 turned, so as to form a stop and hold the wire or strand in place; and within the interior of the lower band is a second series of cross wires or strands 19 located either above or below the cross wires or strands 17 and passing through holes, as do the wires 17, or otherwise secured in place so as to furnish, with the wires or strands 17, a mesh constituting a support and reinforcement for the bottom wall of the well or receiver.

The body of the frame is encircled by a winding of wire or a strand 20 of metal or other suitable material, which winding as shown, is around the exterior of the vertical studs, strips or uprights 3 and 9, and extends from the lower band 2 to the upper band 1 of the body of the frame. The winding of wire or other strand 20 is crossed by wires or strands 21 of metal or other suitable material, so as to form, with the wires or strands 20 of the winding a mesh furnishing a support and reinforcement for the body wall of the well or receptacle, when completed. The vertical wires or strands 21 of the mesh, each has its lower end 22 turned and passed through holes 23 therefor in the lower band 2 of the frame, attaching the lower end of the wires or strands to the band, and the upper end of each vertical wire or strand can be passed through a hole therefor in the upper band 1 and turned for attaching the vertical wires at their upper ends to the band, or the attachment can be made in any other suitable manner. A winding of wire or a strand 24, of metal or other suitable material, encircles the inclined supports 10 and extends around the circumference of the top of the frame, furnishing a support and reinforcement for the top of the wall of the well or receptacle; and a series of cross wires or strands 25 of metal or other suitable material extends over the top winding of wires or strands 24 and across the top supports 11, furnishing, with the winding wires or strands, a mesh forming an upper support or reinforcement for the top wall of the well or receptacle when completed. The upper cross wires or strands 25 can be independent wires or strands, or can be continuations of the vertical wires or strands 21; and if independent wires or strands 25 are used their ends can be attached to the upper band 1, by turning the ends, or otherwise.

The upper and lower bands, with the vertical strips or uprights between them and the side supports or strips 9 with the end extensions 10 and 11 thereof, in connection with the bottom mesh formed by the cross wires or strands 17 and 19 and the body mesh formed by the encircling wires or strands 20 and the vertical cross wires or strands 21 and the top mesh formed by the encircling wires or strands 24 and the cross-side and top wires or strands 25 form an independent frame, which furnishes a support for the concrete wall of the well or receptacle and a reinforcement for strengthening and sustaining the wall, and is a safeguard against inward crushing or forcing of the wall of the well or receptacle, when embodied wholly or partly in the earth.

The well or receptacle, when complete, has a bottom wall 26, a body or side wall 27, an inclined wall 28, and a top wall 29, formed entirely of concrete by the use of a suitable mold or former, as is usual in making concrete walls or work. The top wall 29, as shown, has an annular rim 30 which surrounds an opening 31 extending through the top wall; and below the top wall 29 and within the inclined wall 28 is a chamber 32; and above the bottom wall and within the body or side wall is a chamber 33, which last chamber is for the reception of the battery cells. The chamber 33 has located therein shelves 34, which, as shown, are arranged in tiers, one above the other, and are continuous around the circle of the chamber, but instead of being continuous, the shelves could be otherwise arranged. Each shelf is formed of a plurality of sections, as shown in Figs. 2 and 3, but could be otherwise formed. The shelves are each supported by brackets, and each bracket, as shown, is formed of a horizontal member 35, with an upwardly turned end or stop 36 to engage the edge of the shelf, and a vertical member 37 having an upper and lower keyhole slot 38, so that the horizontal member of each bracket can be entered onto an upper and lower pin 14, and when entered in position, held firmly by the heads of the pins so as to furnish a firm and rigid support by the brackets for the shelves.

The chamber 32 is separated from the chamber 33 by a partition or cross wall 39, having an opening 40 in line with the opening or hole 39, so as to permit access to the chamber 33 when required. The partition or cross wall 39 can be made of boards, and when so made, can have a coating or covering 41 of waterproof material, which coating or covering has an opening 42, coinciding with the opening 40 in the partition or cross wall.

The opening or hole 31 is to be tightly closed by a suitable cover; and, as shown, the cover has a top plate 43 with a depending flange or rim 44 encircling the neck 30; and the depending flange or rim, on one side, has an ear 45, by means of which and a link 46 the cover is connected with the eye or loop 13, so as to be elevated or raised readily, when required for the operator or repairer to enter the receiving chamber of the well or receptacle. The opposite side of the rim or flange 44, to the ear 45 has a strap 47, with a slot for the passage of the end 12 which end has a suitable hole for the reception of the hasp of a lock 48, thus preventing the cover from being raised, except by the party having the key to the lock. The opening, in the partition 39 and the covering or coating 41, is closed by a cover 49, which can be in the form of a stopper cover, as shown, having an eye 50, by which the cover can be raised and set to one side to permit access through the opening 40 into the receiving chamber of the well or receptacle.

The chamber 33 can have located therein a ladder or steps 51, shown by dotted lines in Fig. 2 of the drawing, which ladder or steps, at the upper end, has an extension 52 to engage the under side of the partition or cross wall 39 and the inner face of the body or side wall of the well or receptacle, and has, at its lower end, an extension 53 to rest on the bottom wall of the well or receptacle and engage the inner face of the body or side wall, by which extensions 52 and 53 the ladder or steps is held in an upright position and at the same time can be set at any point desired, so that, from the ladder, the battery cells on the various shelves can be readily reached by the repairer or other party entering the receiving chamber 33 for repairing or recharging the batteries. The neck 30 is to have formed therein one or more holes 54 for the passage of the wires or cables connecting the cells or batteries to the rails or other apparatus of the automatic signals.

In constructing the well or receptacle, the supporting frame, formed of the upper and lower bands, the vertical studs, strips or supports and the bottom, body and top mesh of wires or strands of metal or other suitable material, as hereinbefore described is set up, and the mold or form, between which the walls of the well or receptacle are made, is placed in position around the frame, as usual in making concrete work, it being understood that the mold or form is to be of the knock-down type so that, after the concrete walls have been formed around the frame, the mold or form can be removed, leaving a well or receptacle having integral bottom, side and top walls of concrete, reinforced and supported by the frame embedded in the walls. The shelves can be placed in position by engaging the vertical member of each bracket with the attaching pins, and then placing the shelves in position on the brackets, for the inner edge of each shelf to be engaged by the rib or lip of each horizontal member of the bracket, which attaches the shelf in position and holds the same in a firm manner. The partition or cross wall is placed in position resting on the upper face of the upper band of the frame, or otherwise supported, and the covers for the openings 31 and 40 can be placed in position, with the ladder or steps within the receiving chamber, completing the well or receptacle ready for use.

In use the battery cells to the number desired, are placed on the shelves within the receiving chamber 33; and the material for repairing and recharging and the necessary tools therefor can be placed in the chamber above the partition or cross wall so as to be ready for use, thus dispensing with the necessity of the operator or repairer carrying the appliances with him for making the repairs or for recharging the battery.

The well or receptacle is to be lined with waterproofing and the exterior walls of concrete are to undergo a treatment or process, for making them absolutely waterproof, thereby preventing moisture to permeate the chambers, and when this is done the cell or tank can be shipped or transported to the location where the same is to be used and sunk in the ground or otherwise placed in position.

The well or receptacle of the present invention will be found strong and durable, owing to the supporting and reinforcing frame formed of metal and around which the concrete wall of the well or receptacle is formed; and the detachable brackets within the receiving chamber furnish a means, in connection with the sectional shelving, for placing the shelving in position, either to form an entire circle, or to form semi-circles, as may be desired. The openings permit ready access to the receiving chamber; and, by means of the tight covers for these openings, a safeguard against the admission of air and moisture is obtained and assured.

The well or receptacle of the present invention is air and moisture proof and is non-freezing, thus assuring the maintaining of the batteries in a dry atmosphere and safeguarded against freezing, both of which results are very desirable, particularly with batteries used in railway signaling.

What I regard as new and desire to secure by Letters Patent is:

1. In a battery well, a frame formed of an upper band, a lower band, side uprights connecting the two bands, a bottom mesh attached to the lower band, a body mesh attached to the upper and lower bands, and a top mesh attached to the upper band, in combination with a concrete wall supported and reinforced by the frame, substantially as described.

2. In a battery well, a frame formed from an upper band, a lower band, a plurality of uprights connecting the bands, a cross piece connecting opposite parts of the lower band, side supports one at each end of the cross piece, each side support extending vertically from the lower band to the upper band, then inclined inwardly and then turned horizontally, forming a vertical portion, a diagonal portion and a horizontal top portion, a bottom mesh attached to the lower band, a body mesh attached to the lower and upper bands, and a top mesh attached to the upper band, in combination with a concrete wall supported and reinforced by the frame, substantially as described.

3. In a battery well, a frame formed of an upper band, a lower band, a plurality of uprights connecting the bands, a cross piece connecting opposite parts of the lower band, side supports one at each end of the cross piece, each side support extending vertically from the lower band to the upper band, then inclined inwardly and then turned horizontally, forming a vertical portion, a diagonal portion, and a horizontal top portion, a series of headed pins inwardly projecting from the side uprights and side supports, a bottom mesh attached to the lower band, a body mesh attached to the upper and lower bands, and a top mesh attached to the upper band, substantially as described.

4. In a battery well, a frame formed of an upper band, a lower band, a plurality of uprights connecting the bands, a cross piece connecting the opposite parts of the lower band, side supports one at each end of the cross piece, each side support extending vertically from the lower band to the upper band, then inclined inwardly and then turned horizontally, forming a vertical portion, a diagonal portion and a horizontal top portion, one side support at the inner end of its horizontal portion having an eye and the other side support at the inner end of its horizontal portion having an ear, a bottom mesh attached to the lower band, a body mesh attached to the upper and lower bands, and a top mesh attached to the upper band, substantially as described.

5. In a battery well, a frame formed of an upper band, a lower band, a plurality of uprights connecting the band, a cross piece connecting opposite parts of the lower band, side supports one at each end of the cross piece, each side support extending vertically from the lower band to the upper band, then inclined inwardly and then turned horizontally, forming a vertical portion, a diagonal portion and a horizontal portion, one side support at the inner end of its horizontal portion having an eye and the other side support at the inner end of its horizontal portion having an ear, a series of headed pins inwardly projecting from the side uprights and side supports, a bottom mesh attached to the lower band, a body mesh attached to the lower and upper bands, and a top mesh attached to the upper band, substantially as described.

6. In a battery well, a frame formed of an upper band, a lower band, side uprights connecting the upper and lower bands, a bottom mesh attached to the lower band, a body mesh attached to the lower and upper bands, a top mesh attached to the upper band, in combination with a bottom wall of concrete, a side wall of concrete and a top wall of concrete, the several walls supported and reinforced by the frame, substantially as described.

7. In a battery well, a frame formed of an upper band, a lower band, a plurality of uprights connecting the bands, a cross piece connecting opposite parts of the lower band, side supports one at each end of the cross piece, each side support extending vertically from the lower band to the upper band, then inclined inwardly and then turned horizontally, forming a vertical portion, a diagonal portion, and a horizontal top portion, a bottom mesh attached to the lower band, a body mesh attached to the lower and upper bands, and a top mesh attached to the lower band, in combination with a bottom wall of concrete, a side wall of concrete, and a top wall of concrete, the several walls supported and reinforced by the frame, substantially as described.

8. In a battery well, a frame formed of an upper band, a lower band, a plurality of uprights connecting the bands, a cross piece connecting opposite parts of the lower band, side supports one at each end of the cross piece, each side support extending vertically from the lower band to the upper band, then inwardly inclined and then turned horizontally, forming a vertical portion, a diagonal portion, and a horizontal top portion for each support, a series of headed pins inwardly projecting from the uprights and side supports and extending through the side wall of the well, a bottom mesh attached to the bottom band, a body mesh attached to the lower and upper bands, and a top mesh attached to the upper band, in combination with a bottom wall of concrete, a side wall of concrete, and a top wall of concrete, the several walls supported and reinforced by the frame, substantially as described.

9. In a battery well, a frame formed of an upper band, a lower band, a plurality of uprights connecting the bands, a cross piece connecting opposite parts of the lower band, side supports one side support at each end of the cross piece, each side support extending vertically from the lower band to the upper band, then inwardly inclined and then turned horizontally forming a vertical portion, a diagonal portion, and a horizontal top portion for each support, one side support at the inner end of its horizontal portion having an eye and the other side support at the inner end of its horizontal portion having an ear, a bottom mesh attached to the lower band, a body mesh attached to the lower and upper bands, and a top mesh attached to the upper band, in combination with a bottom wall of concrete, a side wall of concrete, and a top wall of concrete, the several walls supported and reinforced by the frame, substantially as described.

10. In a battery well, a frame formed of an upper band, a lower band, a plurality of uprights connecting the bands, a cross piece connecting opposite parts of the lower band, side supports one at each end of the cross piece, each side support extending vertically from the lower band to the upper band, then inwardly inclined and then turned horizontally, forming a vertical portion, a diagonal portion, and a horizontal top portion, one side support at the inner end of its horizontal portion having an eye and the other side support at the inner end of its horizontal portion having an ear, a series of headed pins inwardly projecting from the side uprights and side supports and extending through the side wall of the well, a bottom mesh attached to the lower band, a body mesh attached to the lower and upper band, and a top mesh attached to the upper band, in combination with a bottom wall of concrete, a side wall of concrete, and a top wall of concrete, the several walls supported and reinforced by the frame, substantially as described.

11. In a battery well, an upper band, a lower band, a plurality of side supports connecting the bands, a series of headed pins inwardly projecting from the side uprights, a bottom mesh attached to the lower band, a body mesh around the side uprights and attached to the lower and upper bands, a bottom wall of concrete, a side wall of concrete supported and reinforced by the bands, the uprights and the bottom and side meshes, a series of brackets within the chamber of the body wall engaged and supported by the headed pins, and shelves carried by the brackets, substantially as described.

12. In a battery well, the combination of a frame, consisting of a bottom formed of a lower band and an attached mesh, a body formed of uprights and a mesh, both connected to the lower band and to an upper band, a top formed of the upper band and an attached mesh, a bottom wall of concrete, a body wall of concrete and a contracted top wall of concrete, the walls furnishing a chamber adapted to receive shelves and the several concrete walls supported and reinforced by the frame, and the top wall having a neck with an opening, and a tight closure for the neck opening, substantially as described.

13. In a battery well, the combination of a frame, consisting of a bottom formed of a lower band and an attached mesh, a body formed of uprights and a mesh, both connected to the lower band and to an upper band, a top formed of the upper band and an attached mesh, a bottom wall of concrete, and a body wall of concrete, the walls furnishing a chamber adapted to receive shelves and a contracted top wall of concrete, the several concrete walls supported and reinforced by the frame, the top wall having a neck with an opening, a tight closure for the neck opening, a partition at the top of the body chamber and having an opening therein, and an air tight cover for the opening in the partition, substantially as described.

14. In a battery well, the combination of a frame formed of an upper band, a lower band, side uprights connecting the bands, a cross piece connecting opposite parts of the lower band, side supports one at each end of the cross piece, each side support extending vertically from the lower band to the upper band, then inwardly inclined, and then turned horizontally, forming a vertical portion, a diagonal portion and a top horizontal portion, one side support at the inner end of its horizontal portion having an eye and the other side support at the inner end of its horizontal portion having an ear, a mesh attached to the lower band for the bottom of the frame, a mesh attached to the lower and upper bands for the body of the frame, a mesh attached to the upper band for the top of the frame, a bottom concrete wall, a body concrete wall and a top concrete wall having a neck inclosing an opening for access to the chamber of the well, an air tight closure connected at one side with the eye of one side support and at the opposite side with the ear of the other side support, and an opening to permit wires or cables to be carried through into the chamber of the well, substantially as described.

CHARLES F. MASSEY.

Witnesses:
 OSCAR W. BOND,
 WALKER BANNING.